United States Patent
Suzuki et al.

(10) Patent No.: US 11,966,120 B2
(45) Date of Patent: Apr. 23, 2024

(54) LIQUID CRYSTAL LIGHT CONTROL ELEMENT

(71) Applicant: Nissan Chemical Corporation, Chuo-ku (JP)

(72) Inventors: Kanako Suzuki, Funabashi (JP); Masaaki Katayama, Funabashi (JP); Masafumi Takahashi, Funabashi (JP); Kazuyoshi Hosaka, Funabashi (JP)

(73) Assignee: Nissan Chemical Corporation, Chuo-ku (JP)

( * ) Notice: Subject to any disclaimer, the term of this patent is extended or adjusted under 35 U.S.C. 154(b) by 67 days.

(21) Appl. No.: 17/765,961

(22) PCT Filed: Sep. 29, 2020

(86) PCT No.: PCT/JP2020/036980
§ 371 (c)(1),
(2) Date: May 16, 2022

(87) PCT Pub. No.: WO2021/065933
PCT Pub. Date: Apr. 8, 2021

(65) Prior Publication Data
US 2023/0028353 A1    Jan. 26, 2023

(30) Foreign Application Priority Data
Oct. 2, 2019    (JP) .................................. 2019-182234

(51) Int. Cl.
*G02F 1/1337* (2006.01)
*C08G 73/10* (2006.01)
(Continued)

(52) U.S. Cl.
CPC ... *G02F 1/133723* (2013.01); *C08G 73/1032* (2013.01); *C08G 73/1042* (2013.01);
(Continued)

(58) Field of Classification Search
CPC .......................... G02F 1/133742; C09K 19/56
(Continued)

(56) References Cited

U.S. PATENT DOCUMENTS

| | | | |
|---|---|---|---|
| 2003/0087045 A1 | 5/2003 | Nakata et al. | |
| 2018/0231845 A1* | 8/2018 | Kwon | ..................... C08L 79/08 |
| 2020/0208055 A1* | 7/2020 | Kwon | ................ C08G 73/1042 |

FOREIGN PATENT DOCUMENTS

| | | |
|---|---|---|
| JP | 9-40964 A | 2/1997 |
| JP | 2001-42324 A | 2/2001 |

(Continued)

OTHER PUBLICATIONS

International Search Report dated Dec. 15, 2020 in PCT/JP2020/036980 filed Sep. 29, 2020, 2 pages.
(Continued)

*Primary Examiner* — Christopher M Raabe
(74) *Attorney, Agent, or Firm* — Oblon, McClelland, Maier & Neustadt, L.L.P.

(57) ABSTRACT

A liquid crystal light control element that controls a light absorption state by voltage application, the liquid crystal light control element including: a liquid crystal layer containing a liquid crystal composition between a pair of substrates each having an electrode; and a liquid crystal alignment film that is provided on at least one of the substrates and aligns a liquid crystal vertically,
wherein the liquid crystal composition contains a liquid crystal and a dichroic dye,
the liquid crystal alignment film is obtained from a liquid crystal aligning agent containing a polyimide precursor in which a diamine having a specific side chain is used as a part of the raw material or a polyimide obtained by imidizing the polyimide precursor, and
(Continued)

the proportion of the diamine used is 50 to 100 mol % based on the entire diamine component.

10 Claims, 1 Drawing Sheet

(51) Int. Cl.
  *C09K 19/56* (2006.01)
  *C09K 19/60* (2006.01)
  *G02F 1/137* (2006.01)
(52) U.S. Cl.
  CPC ....... *C08G 73/105* (2013.01); *C08G 73/1078* (2013.01); *C09K 19/56* (2013.01); *C09K 19/60* (2013.01); *G02F 1/133742* (2021.01); *G02F 1/13712* (2021.01); *G02F 2202/04* (2013.01)
(58) Field of Classification Search
  USPC .......................................................... 349/33
  See application file for complete search history.

(56) References Cited

FOREIGN PATENT DOCUMENTS

| | | |
|---|---|---|
| JP | 2003-114437 A | 4/2003 |
| JP | 2008-106107 A | 5/2008 |
| JP | 2017-21097 A | 1/2017 |
| KR | 10-2005-0025124 | 3/2005 |
| WO | WO 2016/140278 A1 | 9/2016 |

OTHER PUBLICATIONS

Offer of Information issued Jan. 2, 2024, in corresponding Korean Patent Application 10-2022-7013318 (with English-language Translation).

* cited by examiner

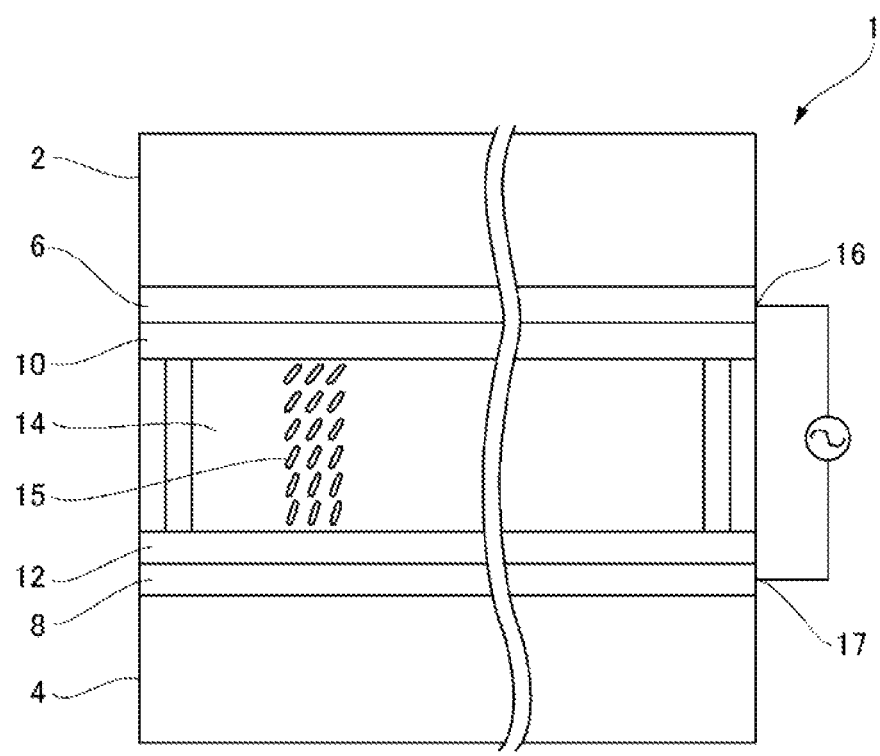

LIQUID CRYSTAL LIGHT CONTROL ELEMENT

TECHNICAL FIELD

The present invention relates to a liquid crystal light control element using a dichroic dye.

BACKGROUND ART

As alternatives to conventional curtains and blinds, many electrical light control elements that variably control the amount of light transmission and visibility according to the degree of voltage applied from the outside have been proposed, and a liquid crystal light control element is also one of them.

In particular, a liquid crystal light control element with a plastic substrate (also referred to as a film substrate) is excellent in lightweight properties and ease of shape processing as compared with that with a glass substrate, and thus can be post-bonded to an existing window glass, and the market is expected to expand in the future.

Various modes for the liquid crystal light control elements are known, and one of them is a mode in which a guest-host type liquid crystal using a dichroic dye and a liquid crystal is used (refer to Patent Literatures 1 and 2).

CITATION LIST

Patent Literature

Patent Literature 1: JP 2017-21097 A
Patent Literature 2: JP H09-40964 A

SUMMARY OF INVENTION

Technical Problem

Since the liquid crystal light control element may be used in a state attached to a window glass of an automobile or an architectural building, even in an environment exposed to irradiation with light including ultraviolet rays for a long period of time, it is necessary that deterioration in optical characteristics of the liquid crystal light control element, specifically, alignment defects of the liquid crystal and deterioration in brightness difference will not occur. Such a liquid crystal light control element has not heretofore been found.

It is therefore an object of the present invention to provide a liquid crystal light control element that has high stability to light including ultraviolet rays, that is, does not undergo deterioration in optical characteristics due to light irradiation.

Solution to Problem

As a result of intensive studies to achieve the above object, the present inventors have accomplished the present invention having the following gist.

That is, the invention is a liquid crystal light control element that controls a light absorption state by voltage application, the liquid crystal light control element including: a liquid crystal layer containing a liquid crystal composition between a pair of substrates each having an electrode; and a liquid crystal alignment film that is provided on at least one substrate of the pair of substrates and aligns a liquid crystal vertically, wherein the liquid crystal composition contains a liquid crystal and a dichroic dye, the liquid crystal alignment film is obtained from a liquid crystal aligning agent containing a polyimide precursor in which a diamine having at least one structure (also referred to as a "specific structure", hereinafter) selected from Formula [1-1] and Formula [1-2] is used as a part of the raw material or a polyimide (also referred to as a polyimide-based polymer) obtained by imidizing the polyimide precursor, and the proportion of the diamine used is 50 to 100 mol % based on the entire diamine component in the polyimide precursor or the polyimide.

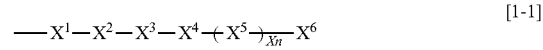

[1-1]

Herein $X^1$ represents a single bond, $-(CH_2)_a-$ (wherein a is an integer of 1 to 15), $-O-$, $-CH_2O-$, $-CONH-$, $-NHCO-$, $-CON(CH_3)-$, $-N(CH_3)CO-$, $-COO-$, or $-OCO-$. $X^2$ represents a single bond or $-(CH_2)_b-$ (wherein b is an integer of 1 to 15). $X^3$ represents a single bond, $-(CH_2)_c-$ (wherein c is an integer of 1 to 15), $-O-$, $-CH_2O-$, $-COO-$, or $-OCO$. $X^4$ represents a divalent cyclic group selected from a benzene ring, a cyclohexane ring, and a heterocyclic ring, or a $C_{17}$-$C_{51}$ divalent organic group having a steroid skeleton, and any hydrogen atom on the cyclic group may be substituted with a $C_1$-$C_3$ alkyl group, a $C_1$-$C_3$ alkoxy group, a $C_1$-$C_3$ fluorine-containing alkyl group, a $C_1$-$C_3$ fluorine-containing alkoxy group, or a fluorine atom. $X^5$ represents a divalent cyclic group selected from a benzene ring, a cyclohexane ring, and a heterocyclic ring, and any hydrogen atom on these cyclic groups may be substituted with a $C_1$-$C_3$ alkyl group, a $C_1$-$C_3$ alkoxy group, a $C_1$-$C_3$ fluorine-containing alkyl group, a $C_1$-$C_3$ fluorine-containing alkoxy group, or a fluorine atom. $Xn$ represents an integer of 0 to 4. $X^6$ represents a $C_1$-$C_{16}$ alkyl group, a $C_2$-$C_{18}$ alkenyl group, a $C_1$-$C_{18}$ fluorine-containing alkyl group, a $C_1$-$C_{18}$ alkoxy group, or a $C_1$-$C_{18}$ fluorine-containing alkoxy group.

[1-2]

Herein $X^7$ represents a single bond, $-O-$, $-CH_2O-$, $-CONH-$, $-NHCO-$, $-CON(CH_3)-$, $-N(CH_3)CO-$, $-COO-$, or $-OCO-$. $X^8$ represents a $C_8$-$C_{22}$ alkyl group or a $C_6$-$C_{18}$ fluorine-containing alkyl group.

Advantageous Effects of Invention

According to the present invention, it is possible to obtain a liquid crystal light control element that does not undergo deterioration in optical characteristics due to light irradiation. Thus, the liquid crystal light control element of the present invention is useful for e.g. liquid crystal displays intended for display and light control windows and optical shutters for controlling transmission and blocking of light.

BRIEF DESCRIPTION OF DRAWINGS

FIG. 1 is a cross-sectional view of an example of a liquid crystal light control element.

DESCRIPTION OF EMBODIMENTS

<Specific Structure>

The specific structure is a structure of Formula [1-1] or Formula [1-2].

In Formula [1-1], $X^1$ to $X^6$ and Xn are as defined above, and among them, the following moieties are preferable.

$X^1$ is preferably a single bond, —$(CH_2)_a$— (wherein a is an integer of 1 to 15), —O—, —$CH_2O$—, or —COO— from the viewpoints of availability of the raw material and ease of synthesis. More preferred is a single bond, —$(CH_2)_a$— (wherein a is an integer of 1 to 10), —O—, —$CH_2O$—, or —COO—.

$X^2$ is preferably a single bond or —$(CH_2)_b$— (wherein b is an integer of 1 to 10).

$X^3$ is preferably a single bond, —$(CH_2)_c$— (wherein c is an integer of 1 to 15), —O—, —$CH_2O$—, or —COO— from the viewpoint of ease of synthesis. More preferred is a single bond, —$(CH_2)_c$— (wherein c is an integer of 1 to 10), —O—, —$CH_2O$—, or —COO—.

$X^4$ is preferably a benzene ring as a divalent cyclic group, a cyclohexane ring as a divalent cyclic group, or a $C_{17}$-$C_{51}$ divalent organic group having a steroid skeleton from the viewpoint of ease of synthesis.

$X^5$ is preferably a benzene ring as a divalent cyclic group or a cyclohexane ring as a divalent cyclic group.

$X^6$ is preferably a $C_1$-$C_{18}$ alkyl group, a $C_1$-$C_{10}$ fluorine-containing alkyl group, a $C_1$-$C_{18}$ alkoxy group, or a $C_1$-$C_{10}$ fluorine-containing alkoxy group. More preferred is a $C_1$-$C_{12}$ alkyl group or a $C_1$-$C_{12}$ alkoxy group. Particularly preferred is a $C_1$-$C_9$ alkyl group or a $C_1$-$C_9$ alkoxy group.

Xn is preferably 0 to 3 from the viewpoints of availability of the raw material and ease of synthesis. More preferred is 0 to 2.

Preferred combinations of $X^1$ to $X^6$ and Xn include the same combinations as Formula (2-1) to Formula (2-629) listed in Table 6 to Table 47 on pages 13 to 34 of International Publication WO 2011/132751 (published on Oct. 27, 2011). In each table of International Publication WO 2011/132751, $X^1$ to $X^6$ in the present invention are indicated as Y1 to Y6, and Xn is indicated as n, but Y1 to Y6 are to be read as $X^1$ to $X^6$, and n is to be read as Xn. In Formula (2-605) to Formula (2-629) listed in each table of International Publication WO 2011/132751, the $C_{17}$-$C_{51}$ organic group having a steroid skeleton in the present invention is indicated as a $C_{12}$-$C_{25}$ organic group having a steroid skeleton, but the $C_{12}$-$C_{25}$ organic group having a steroid skeleton is to be read as the $C_{17}$-$C_{51}$ organic group having a steroid skeleton.

Among them, combinations of Formula (2-25) to Formula (2-96), Formula (2-145) to Formula (2-168), Formula (2-217) to Formula (2-240), Formula (2-268) to Formula (2-315), Formula (2-364) to Formula (2-387), Formula (2-436) to Formula (2-483), or Formula (2-603) to Formula (2-615) are preferable. Particularly preferred are Formula (2-49) to Formula (2-96), Formula (2-145) to Formula (2-168), Formula (2-217) to Formula (2-240), Formula (2-603) to Formula (2-606), Formula (2-607) to Formula (2-609), Formula (2-611), Formula (2-612), or Formula (2-624).

In Formula [1-2], $X^7$ and $X^8$ are as defined above, and among them, the following moieties are preferable.

$X^7$ is preferably a single bond, —O—, —$CH_2O$—, —CONH—, —$CON(CH_3)$—, or —COO—. More preferred is a single bond, —O—, —CONH—, or —COO—.

$X^8$ is preferably a $C_8$-$C_{18}$ alkyl group.

As the specific structure, it is preferable to use the structure of Formula [1-1] from the viewpoint that it is possible to suppress deterioration in optical characteristics of the liquid crystal light control element due to light irradiation.

<Polyimide-Based Polymer>

The polyimide-based polymer is at least one polymer (polyimide-based polymer) selected from polyimide precursors in which a diamine having at least one structure selected from Formula [1-1] and Formula [1-2] is used as a part of the raw material or polyimides obtained by imidizing the polyimide precursors. The polyimide precursor or the polyimide can be obtained by reacting a diamine component and a tetracarboxylic acid component.

The polyimide precursor has, for example, a structure of Formula [A].

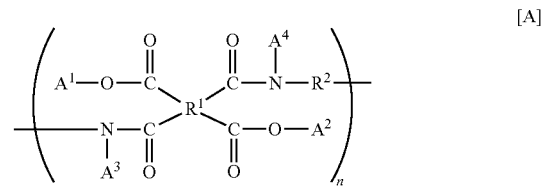

Herein $R^1$ represents a tetravalent organic group. $R^2$ represents a divalent organic group. $A^1$ and $A^2$ each represent a hydrogen atom or a $C_1$-$C_5$ alkyl group. $A^3$ and $A^4$ each represent a hydrogen atom, a $C_1$-$C_5$ alkyl group, or an acetyl group. The letter n represents a positive integer.

The diamine component is a diamine having two primary or secondary amino groups in the molecule, and examples of the tetracarboxylic acid component include tetracarboxylic acid compounds, tetracarboxylic acid dianhydrides, tetracarboxylic acid dihalide compounds, tetracarboxylic acid dialkyl ester compounds, and tetracarboxylic acid dialkyl ester dihalide compounds.

The polyimide-based polymer is preferably a polyamic acid having a structural formula in which the repeating unit is represented by Formula [D] or a polyimide obtained by imidizing the polyamic acid because it can be relatively easily obtained using a tetracarboxylic acid dianhydride of Formula [B] and a diamine of Formula [C] as the raw material.

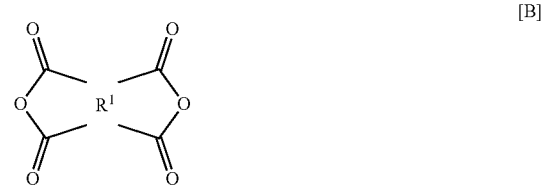

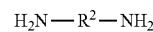

Herein $R^1$ and $R^2$ are the same as defined in Formula [A].

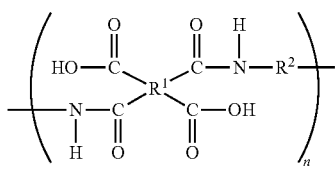

[D]

Herein $R^1$ and $R^2$ are the same as defined in Formula [A].

By a conventional synthesis method, it is also possible to introduce a $C_1$-$C_8$ alkyl group represented by $A^1$ and by $A^2$ in Formula [A] and a $C_1$-$C_5$ alkyl group or an acetyl group represented by $A^3$ and by $A^4$ in Formula [A] into the polymer of Formula [D] obtained as described above.

As a method for introducing the specific structure into the polyimide-based polymer, a diamine compound having a specific structure is used as a part of the raw material. In particular, it is preferable to use a diamine of Formula [1a] (also referred to as a "specific diamine").

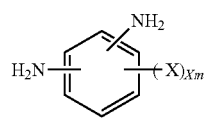

[1a]

X represents a structure of Formula [1-1] or Formula [1-2]. Details and the preferable combination of $X^1$ to $X^6$ and Xn in Formula [1-1] are as described above for Formula [1-1], and details and the preferable combination of $X^7$ and $X^8$ in Formula [1-2] are as described above for Formula [1-2].

Xm represents an integer of 1 to 4. Among them, 1 or 2 is preferable. When Xm is 2 or more, a plurality of Xs each independently have the above definition.

Specific examples of the specific diamine in which X in Formula [1a] is represented by Formula [1-1] include the diamine compounds of Formula [2-1] to Formula [2-6] and Formula [2-9] to Formula [2-36] described on pages 15 to 19 of International Publication WO 2013/125595 (published on Aug. 29, 2013). In the description of International Publication WO 2013/125595, $R_2$ in Formula [2-1] to Formula [2-3] and $R_4$ in Formula [2-4] to Formula [2-6] each represent a $C_1$-$C_{18}$ alkyl group, a $C_1$-$C_{18}$ fluorine-containing alkyl group, a $C_1$-$C_{18}$ alkoxy group, or a $C_1$-$C_{18}$ fluorine-containing alkoxy group. $A_4$ in Formula [2-13] represents a $C_3$-$C_{18}$ straight or branched alkyl group. $R_3$ in Formula [2-4] to Formula [2-6] represents —O—, —CH$_2$O—, —COO—, or —OCO—.

Among them, preferred specific diamines are diamine compounds of Formula [2-1] to Formula [2-6], Formula [2-9] to Formula [2-13], or Formula [2-22] to Formula [2-31] described in International Publication WO 2013/125595.

The diamines of Formula [1a-32] to Formula [1a-41] are more preferred from the viewpoint of optical characteristics of the liquid crystal light control element.

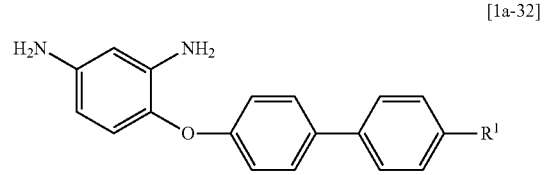

[1a-32]

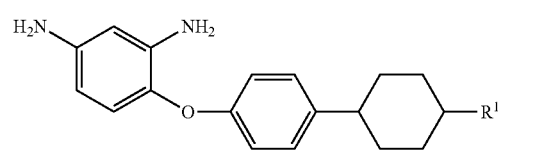

[1a-33]

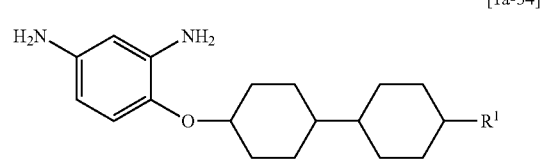

[1a-34]

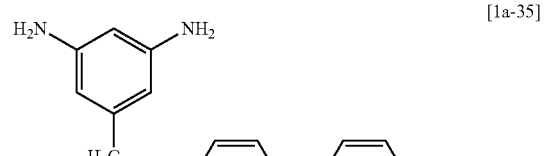

[1a-35]

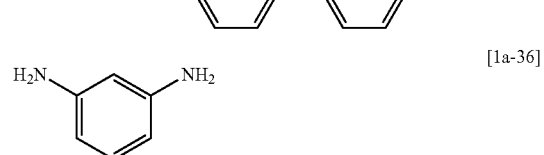

[1a-36]

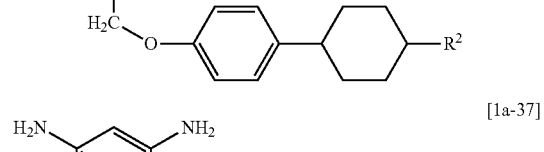

[1a-37]

Herein $R^3$ and $R^2$ each represent a $C_3$-$C_{12}$ alkyl group.

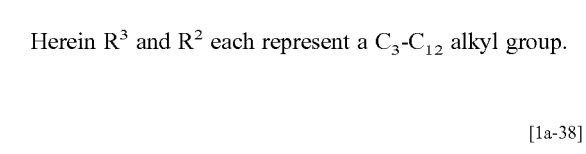

[1a-38]

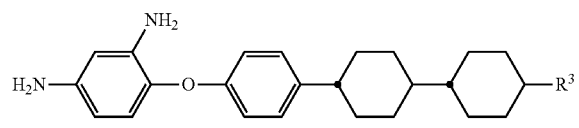

[1a-39]

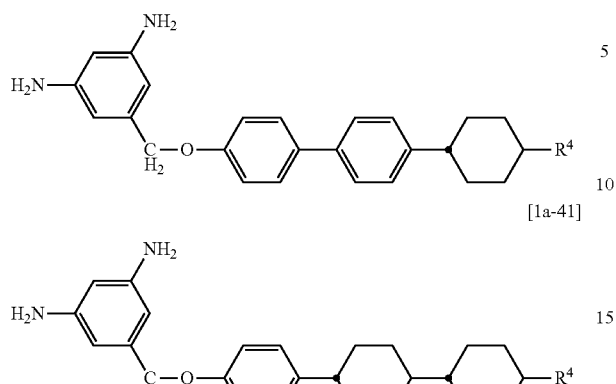
[1a-40]

[1a-41]

Herein R³ and R⁴ each represent a $C_3$-$C_{12}$ alkyl group, and as for cis-trans isomerism, the 1,4-cyclohexylene is a trans isomer.

The diamine of any one of Formula [1a-33], Formula [1a-35] to Formula [1a-37], and Formula [1a-39] to Formula [1a-41] is particularly preferred from the viewpoint of optical characteristics of the liquid crystal light control element.

Specific examples of the specific diamine in which X in Formula [1a] is represented by Formula [1-2] include the diamine compounds of Formula [DA1] to Formula [DA11] described on page 23 of International Publication WO 2013/125595 (published on Aug. 29, 2013). In the description of International Publication WO 2013/125595, $A_1$ in Formula [DA1] to Formula [DA5] represents a $C_8$-$C_{22}$ alkyl group or a $C_6$-$C_{18}$ fluorine-containing alkyl group.

The proportion of the specific diamine used is 50 to 100 mol % based on the entire diamine component in the polyimide-based polymer from the viewpoint of optical characteristics of the liquid crystal light control element. Preferred is 60 to 100 mol %. More preferred is 80 to 100 mol %. Particularly preferred is 100 mol %. The specific diamine can be used alone or in admixture of two or more depending on the respective properties.

As the tetracarboxylic acid component for producing the polyimide-based polymer, it is preferable to use a tetracarboxylic acid dianhydride represented by Formula [2], or its tetracarboxylic acid derivative such as a tetracarboxylic acid, a tetracarboxylic acid dihalide, a tetracarboxylic acid dialkyl ester, or a tetracarboxylic acid dialkyl ester dihalide (all also collectively referred to as specific tetracarboxylic acid components).

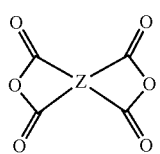
[2]

Z represents any one structure selected from Formula [2a] to Formula [2i].

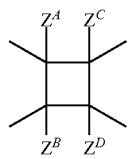
[2a]

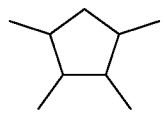
[2b]

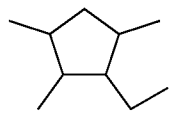
[2c]

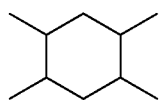
[2d]

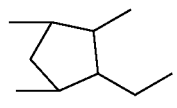
[2e]

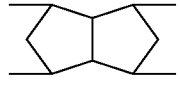
[2f]

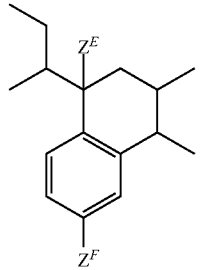
[2g]

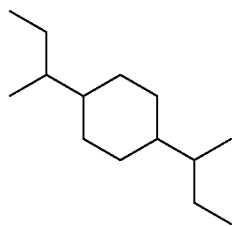
[2h]

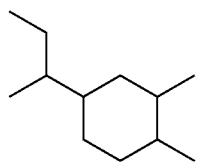
[2i]

-continued

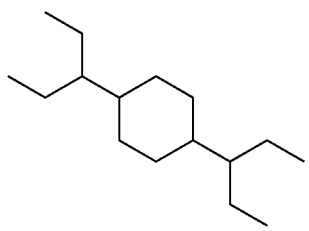
[2j]

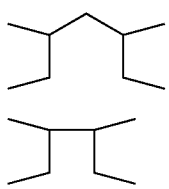
[2k]

[2l]

Herein $Z^A$ to $Z^D$ each independently represent a hydrogen atom, a methyl group, a chlorine atom, or a phenyl group. $Z^E$ and $Z^F$ each independently represent a hydrogen atom or a methyl group.

Among them, Z in Formula [2] is preferably Formula [2a], Formula [2c], Formula [2d], Formula [2e], Formula [2f], Formula [2g], Formula [2k], or Formula [2l] from the viewpoints of ease of synthesis and ease of polymerization reaction in production of the polymer. More preferred is Formula [2a], Formula [2e], Formula [2f], Formula [2g], Formula [2k], or Formula [2l]. Particularly preferred is Formula [2a], Formula [2e], Formula [2f], Formula [2g], or Formula [2l] from the viewpoint of optical characteristics of the liquid crystal light control element.

The proportion of the specific tetracarboxylic acid component used is preferably 1 mol % or more based on the entire tetracarboxylic acid component in the polyimide-based polymer. More preferred is 5 mol % or more. Particularly preferred is 10 to 100 mol % from the viewpoint of optical characteristics of the liquid crystal light control element.

In the polyimide-based polymer, other tetracarboxylic acid components other than the specific tetracarboxylic acid component can be used as long as the effect of the present invention is not impaired. Examples of the other tetracarboxylic acid component include tetracarboxylic acid compounds, tetracarboxylic acid dianhydrides, dicarboxylic acid dihalide compounds, dicarboxylic acid dialkyl ester compounds, and dialkyl ester dihalide compounds as described below.

Specific examples thereof include the other tetracarboxylic acid components described on pages 34 and 35 of International Publication WO 2015/012368 A (published on Jan. 29, 2015).

The specific tetracarboxylic acid component and the other tetracarboxylic acid component can be used alone or in admixture of two or more depending on the respective properties.

The method for synthesizing the polyimide-based polymer is not particularly limited. It is typically obtained by reacting a diamine component with a tetracarboxylic acid component. Specific examples thereof include the methods described on pages 35 and 36 of International Publication WO 2015/012368 A (published on Jan. 29, 2015).

The reaction between the diamine component and the tetracarboxylic acid component is typically performed in a solvent containing the diamine component and the tetracarboxylic acid component. The solvent used at that time is not particularly limited as long as the produced polyimide precursor is dissolved therein.

Specific examples thereof include N-methyl-2-pyrrolidone, N-ethyl-2-pyrrolidone, γ-butyrolactone, N,N-dimethylformamide, N, N-dimethylacetamide, dimethyl sulfoxide, or 1,3-dimethyl-2-imidazolidinone. When the polyimide precursor has high solvent solubility, methyl ethyl ketone, cyclohexanone, cyclopentanone, 4-hydroxy-4-methyl-2-pentanone, or solvents of Formula [D1] to Formula [D3] can be used.

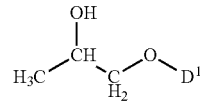
[D1]

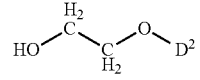
[D2]

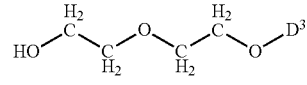
[D3]

Herein $D^1$ and $D^2$ each represent a $C_1$-$C_3$ alkyl group. $D^3$ represents a $C_1$-$C_4$ alkyl group.

These may be used alone or in admixture. Even a solvent that does not dissolve the polyimide precursor may be used in admixture with the above solvent as long as the produced polyimide precursor does not precipitate. Since moisture in the organic solvent interferes with the polymerization reaction and causes hydrolysis of the produced polyimide precursor, it is preferable to use a dehydrated and dried organic solvent.

In the polymerization reaction of the polyimide precursor, the total number of moles of the tetracarboxylic acid component is preferably 0.8 to 1.2 when the total number of moles of the diamine component is 1.0. When the total number of moles of the tetracarboxylic acid component is smaller than 1.0, that is, when the total number of moles of the tetracarboxylic acid component is smaller than the number of moles of the diamine component, the end of the polymer has a structure of an amino group. When the total number of moles of the tetracarboxylic acid component is larger than 1.0, that is, when the total number of moles of the tetracarboxylic acid component is larger than the number of moles of the diamine component, the end of the polymer has a structure of a carboxylic acid anhydride or a dicarboxylic acid. In the present invention, the total number of moles of the tetracarboxylic acid component is preferably larger than 1.0, that is, the total number of moles of the tetracarboxylic acid component is preferably larger than the number of moles of the diamine component. Specifically, the total number of moles of the tetracarboxylic acid component is preferably 1.05 to 1.20 when the total number of moles of the diamine component is 1.0.

The polyimide is a polyimide obtained by cyclizing a polyimide precursor, and in this polyimide, the cyclization rate (also referred to as imidization rate) of the amic acid group is not necessarily 100% and can be adjusted as desired depending on its application or purpose. In particular, the cyclization rate is preferably 30 to 85% from the viewpoint of the solubility of the polyimide-based polymer in a solvent. More preferred is 40 to 80%.

The molecular weight of the polyimide-based polymer is preferably 5,000 to 1,000,000 as the weight average molecular weight (Mw) measured by a Gel Permeation Chromatography (GPC) method, in consideration of the strength of the resin film obtained from the polyimide-based polymer, and workability and coating film properties during forming the resin film. More preferred is 10,000 to 150,000.

<Liquid Crystal Aligning Agent>

The liquid crystal aligning agent is a solution for forming a liquid crystal alignment film and is a solution containing a polyimide-based polymer having a specific structure and a solvent. Two or more types of polyimide-based polymers having a specific structure can be used.

Not all of the polymer components have to be polyimide-based polymers having a specific structure. Polyimide-based polymers having no specific structure may be mixed. When used, the proportion of the polyimide-based polymer having no specific structure is preferably 10 to 200 parts by mass based on 100 parts by mass of all the polyimide-based polymers having a specific structure.

In addition, the liquid crystal aligning agent may contain a polyimide precursor in which the tetracarboxylic acid of Formula [2] is used as a part of the raw material or a polyimide obtained by imidizing the polyimide precursor, as the polyimide precursor or the polyimide (polyimide-based polymer having a specific structure) described above. The liquid crystal aligning agent may contain a polyimide precursor in which the tetracarboxylic acid of Formula [2] is used as a part of the raw material or a polyimide obtained by imidizing the polyimide precursor, as another polyimide precursor or another polyimide different from the polyimide-based polymer having a specific structure.

The term "raw material" used herein does not refer to a tetracarboxylic acid component, but refers to a raw material also containing a diamine component. Thus, in the polyimide precursor using the tetracarboxylic acid of Formula [2] as a part of the raw material or the polyimide precursor, the proportion of the tetracarboxylic acid of Formula [2] used may be 100 mol % based on the entire tetracarboxylic acid component.

The content of the solvent in the liquid crystal aligning agent can be appropriately selected from the viewpoints of the method for applying the liquid crystal aligning agent and formation of a desired film thickness. In particular, the content of the solvent in the liquid crystal aligning agent is preferably 50 to 99.9 mass % from the viewpoint of formation of a uniform liquid crystal alignment film by applying the agent. More preferred is 60 to 99 mass %. Particularly preferred is 65 to 99 mass %.

The solvent used for the liquid crystal aligning agent is not particularly limited as long as it is a solvent that dissolves the polyimide-based polymer having a specific structure. In particular, it is preferable to use the following solvent (also referred to as solvent A).

Examples thereof include N,N-dimethylformamide, N,N-dimethylacetamide, N-methyl-2-pyrrolidone, N-ethyl-2-pyrrolidone, dimethyl sulfoxide, γ-butyrolactone, 1,3-dimethyl-2-imidazolidinone, methyl ethyl ketone, cyclohexanone, cyclopentanone, and 4-hydroxy-4-methyl-2-pentanone. Among them, it is preferable to use N-methyl-2-pyrrolidone, N-ethyl-2-pyrrolidone, or γ-butyrolactone. These may be used alone or in admixture.

When the polyimide-based polymer has high solubility in a solvent, the following solvent (also referred to as solvent B) can be used.

Specific examples of the solvent B include the solvent B described on pages 58 to 60 of International Publication WO 2014/171493 (published on Oct. 23, 2014). Among them, it is preferable to use 1-hexanol, cyclohexanol, 1,2-ethanediol, 1,2-propanediol, propylene glycol monobutyl ether, ethylene glycol monobutyl ether, dipropylene glycol dimethyl ether, cyclohexanone, cyclopentanone, or Formula [D1] to Formula [D3].

The solvent B can enhance the coating film properties and the surface smoothness of the liquid crystal alignment film when the liquid crystal aligning agent is applied, and thus it is preferable to use the solvent B in combination with the solvent A.

For the purpose of improving the coating properties of the liquid crystal aligning agent, it is preferable to use N-methyl-2-pyrrolidone, N-ethyl-2-pyrrolidone, or γ-butyrolactone as the solvent A in combination with the solvent B. More preferably, γ-butyrolactone is used in combination.

When the solvent A and solvent B are used in combination, the amount of the solvent B is preferably 1 to 99 mass % of the entire solvent contained in the liquid crystal aligning agent. More preferred is 10 to 99 mass %. Particularly preferred is 20 to 95 mass %.

In order to increase the film strength of the liquid crystal alignment film, it is preferable to introduce a compound having at least one selected from an epoxy group, an isocyanate group, an oxetane group, a cyclocarbonate group, a hydroxy group, a hydroxyalkyl group, and a lower alkoxyalkyl group (also collectively referred to as crosslinking compounds) into the liquid crystal aligning agent. In such a case, the compound is required to have two or more of these groups.

Examples of the lower alkoxyalkyl group include a $C_1$-$C_3$ alkoxyalkyl group.

Specific examples of the crosslinking compound having an epoxy group or an isocyanate group include the crosslinking compounds having an epoxy group or an isocyanate group described on pages 63 and 64 of International Publication WO 2014/171493 (published on Oct. 23, 2014).

Specific examples of the crosslinking compound having an oxetane group include the crosslinking compounds of Formula [4a] to Formula [4k] described on pages 58 and 59 of International Publication WO 2011/132751 (published on Oct. 27, 2011).

Specific examples of the crosslinking compound having a cyclocarbonate group include the crosslinking compounds of Formula [5-1] to Formula [5-42] described on pages 76 to 82 of International Publication WO 2012/014898 (published on Feb. 2, 2012).

Specific examples of the crosslinking compound having a hydroxy group, a hydroxyalkyl group, and a lower alkoxyalkyl group include the melamine derivatives or the benzoguanamine derivatives described on pages 65 and 66 of International Publication WO 2014/171493 (published on Oct. 23, 2014), and the crosslinking compounds of Formula [6-1] to Formula [6-48] described on pages 62 to 66 of International Publication WO 2011/132751 (published on Oct. 27, 2011).

The proportion of the crosslinking compound used in the liquid crystal aligning agent is preferably 0.1 to 100 parts by mass based on 100 parts by mass of all the polymer components. The proportion of the compound used is more preferably 0.1 to 50 parts by mass in order to allow the crosslinking reaction to proceed and exert the desired effect. Particularly preferred is 1 to 30 parts by mass.

In the liquid crystal aligning agent, it is possible to use a compound that improves the uniformity of the film thickness and the surface smoothness of the liquid crystal alignment film when the liquid crystal aligning agent is applied, as long as the effects of the present invention are not impaired. In addition, for example, a compound that improves adhesion between the liquid crystal alignment film and the substrate may be used.

Examples of the compound that improves the uniformity of the film thickness and the surface smoothness of the liquid crystal alignment film include fluorine-based surfactants, silicone-based surfactants, or nonionic surfactants. Specific examples thereof include the surfactants described on page 67 of International Publication WO 2014/171493 (published on Oct. 23, 2014). The proportion of the compound used is preferably 0.01 to 2 parts by mass based on 100 parts by mass of all the polymer components. More preferred is 0.01 to 1 part by mass.

Specific examples of the compound that improves the adhesion between the liquid crystal alignment film and the substrate include the compounds described on pages 67 to 69 of International Publication WO 2014/171493 A (published on Oct. 23, 2014). The proportion of the compound used is preferably 0.1 to 30 parts by mass based on 100 parts by mass of all the polymer components. More preferred is 1 to 20 parts by mass.

As a compound other than the above compounds, a dielectric or a conductive substance for the purpose of altering the electrical characteristics such as dielectric constant and conductivity of the liquid crystal alignment film may be added to the liquid crystal aligning agent.

<Liquid Crystal Composition>

The liquid crystal composition contains a liquid crystal and a dichroic dye. In the liquid crystal light control element of the present invention, since the dichroic dye changes by 90° along the direction of the liquid crystal director (direction of alignment) depending on the presence or absence of voltage application, it is possible to obtain a brightness difference (difference between colorless transparent and colored state) of the total light transmittance by utilizing the difference in light absorption properties of the dichroic dye.

As the liquid crystal, a nematic liquid crystal, a smectic liquid crystal, or a cholesteric liquid crystal can be used. In particular, a liquid crystal having negative dielectric anisotropy is preferably used for the liquid crystal light control element in the present invention. In this case, when a voltage is not applied, there is no absorption of the dichroic dye, so that the element becomes colorless transparent. When a voltage is applied, there is absorption, so that the element becomes colored.

From the viewpoints of low-voltage driving and scattering characteristics, a liquid crystal having a large dielectric anisotropy and a large refractive index anisotropy is preferable. For the liquid crystal, depending on the respective physical property values of the phase transition temperature, the dielectric anisotropy and the refractive index anisotropy, two or more types of liquid crystals can be used in admixture.

In order to drive the liquid crystal light control element as an active element such as a thin film transistor (TFT), the liquid crystal is required to have high electrical resistance and a high voltage holding ratio (also referred to as VHR). Hence, as the liquid crystal, it is preferable to use a fluorine-based or chlorine-based liquid crystal which has high electrical resistance and VHR that is not lowered due to active energy rays such as ultraviolet rays.

The dichroic dye is a substance capable of absorbing or deforming light in at least a part or the entire range of a visible light region, for example, a wavelength range of 400 nm to 700 nm. The use of the dichroic dye with the liquid crystal enables anisotropic absorption of light in at least a part or the entire range of the visible light region and control of the color density, specifically, colorless transparent and colored state of the liquid crystal light control element.

The type of the dichroic dye is not particularly limited. For example, a black dye or a color dye can be used.

The proportion of the dichroic dye used in the liquid crystal composition is preferably 0.01 to 10 parts by mass based on 100 parts by mass of the liquid crystal. More preferred is 0.1 to 5 parts by mass from the viewpoint of the difference between colorless transparent and colored state (also referred to as contrast of total light transmittance).

The liquid crystal composition can be prepared by mixing a liquid crystal and a dichroic dye. From the viewpoint of the solubility of the dichroic dye in the liquid crystal, it is preferable to perform heating during preparation. Specifically, heating is preferably performed at a temperature not exceeding the phase transition temperature of the liquid crystal.

<Method for Producing Liquid Crystal Light Control Element>

The liquid crystal light control element has a pair of substrates provided with electrodes.

The substrate used for the liquid crystal light control element is not particularly limited as long as it is a substrate having high transparency, and a plastic substrate such as an acrylic substrate, a polycarbonate substrate, or a polyethylene terephthalate (PET) substrate can be used other than a glass substrate. In the case of use for a light control window or the like, a plastic substrate is preferable. From the viewpoint of simplifying the process, it is preferable to use a substrate having an ITO electrode, an indium zinc oxide (IZO) electrode, an indium gallium zinc oxide (IGZO) electrode, an organic conductive film, or the like formed thereon for driving the liquid crystal. In the case of a reflection type liquid crystal light control element, a silicon wafer, a metal such as aluminum, or a substrate having a dielectric multilayer film formed thereon can be used only as one of the pair of substrates.

The thickness of the plastic substrate is not particularly limited. When the thickness is thin, the plastic substrate may be referred to as plastic film.

The liquid crystal light control element includes a liquid crystal alignment film obtained from a liquid crystal aligning agent containing a polyimide-based polymer having a specific structure on at least one substrate of a pair of substrates. In particular, it is preferable that both substrates have a liquid crystal alignment film.

The method for applying the liquid crystal aligning agent is not particularly limited, but industrially, screen printing, offset printing, flexographic printing, an inkjet method, a dipping method, a roll coater method, a slit coater method, a spinner method, a spray method, and similar methods are available. The method can be appropriately selected depending on the type of the substrate and the desired film thickness of the liquid crystal alignment film.

The liquid crystal alignment film can be formed by applying a liquid crystal aligning agent onto the substrate, and then evaporating the solvent using heating means such as a hot plate, a heat circulation type oven, or an infrared ray (IR) type oven at a temperature of 30 to 300° C., preferably 30 to 250° C. depending on the type of the substrate and the solvent used in the liquid crystal aligning agent. When a plastic substrate is used as the substrate, the treatment is preferably performed at a temperature of 30 to 150° C.

The thickness of the liquid crystal alignment film after baking is preferably 5 to 500 nm. If the film is too thick, it may be disadvantageous from the power consumption aspect of the liquid crystal light control element. If it is too thin, the reliability of the element may be reduced. More preferred is 10 to 300 nm. Particularly preferred is 10 to 250 nm.

When liquid crystals are tilt-aligned or horizontally aligned as in a liquid crystal display element for a twisted nematic (TN) mode or an in-plane switching (IPS) mode, the liquid crystal alignment film after baking is subjected to alignment treatment by a rubbing treatment method, a photoalignment treatment method, or the like. By contrast, for a Vertical Alignment (VA) mode, it is not necessary to perform alignment treatment.

The liquid crystal composition used in the liquid crystal light control element is the liquid crystal composition described above, but therein, a spacer may be introduced to control the space (also referred to as gap) between electrodes of the liquid crystal light control element.

The method for injecting the liquid crystal composition is not particularly limited, and examples thereof include the following methods. That is, in the case where a glass substrate is used as the substrate, the method is as follows. A pair of substrates each having a liquid crystal alignment film formed thereon are prepared, a sealant is applied to four sides of one of the substrates except for a part, and the other substrate is bonded such that the liquid crystal alignment film surfaces face inward, to prepare an empty cell. Then, the liquid crystal composition is injected under reduced pressure from the part not coated with the sealant, to obtain a liquid crystal composition-injected cell. In the case where a plastic substrate is used as the substrate, the method is as follows. A pair of substrates each having a liquid crystal alignment film formed thereon are prepared, the liquid crystal composition is dropped on one of the substrates by a One Drop Filling (ODF) method, an inkjet method or the like, and then the other substrate is bonded to obtain a liquid crystal composition-injected cell.

The gap of the liquid crystal light control element can be controlled by the spacer or the like. Examples of the method include introducing a spacer of the desired size into the liquid crystal composition, as described above and using a substrate having a column spacer of the desired size. In the case where a plastic substrate is used as the substrate and the substrates are bonded by lamination, the gap can be controlled without introducing spacers.

The size of the gap of the liquid crystal light control element is preferably 1 to 100 μm. More preferred is 1 to 50 μm. Particularly preferred is 2 to 30 μm. If the gap is too small, the contrast of the total light transmittance of the liquid crystal light control element is decreased. If the gap is too large, the driving voltage of the element is increased.

In the liquid crystal light control element, a polarizing plate is preferably bonded to the outer surface thereof in order to increase the contrast of the total light transmittance.

An example of the liquid crystal light control element will be described.

As shown in FIG. 1, a liquid crystal light control element 1 includes a first transparent substrate 2 and a second transparent substrate 4 extending in parallel at an interval from each other, a first transparent electrode 6 and a second transparent electrode 8 formed on surfaces of the first transparent substrate 2 and the second transparent substrate 4 facing each other, a first liquid crystal alignment film 10 and a second liquid crystal alignment film 12 formed on the surfaces of the first transparent electrode 6 and the second transparent electrode 8 facing each other, respectively, and a liquid crystal layer 14 sealed between the first liquid crystal alignment film 10 and the second liquid crystal alignment film 12. The liquid crystal layer 14 contains rod-shaped liquid crystal molecules 15.

The first transparent electrode 6 and the second transparent electrode 8 are each formed of a transparent conductive film, and the transparent conductive film is a transparent conductive material formed into a thin film having a uniform thickness.

The first transparent substrate 2 is provided with a first connection terminal 16 electrically connected to the first transparent electrode 6, and the second transparent substrate 4 is provided with a second connection terminal 17 electrically connected to the second transparent electrode 8.

The element is configured such that an operating voltage for driving the liquid crystal is applied between the first connection terminal 16 and the second connection terminal 17.

In this example, at least one of the first liquid crystal alignment film 10 and the second liquid crystal alignment film 12 is required to be the liquid crystal alignment film of the present invention, but both are preferably the liquid crystal alignment films of the present invention.

The liquid crystal light control element 1 includes a cell in which the liquid crystal layer 14 contains liquid crystal molecules 15 and a dichroic dye. In this example, the liquid crystal molecules 15 are negative type molecules having negative dielectric anisotropy, and the dichromatic dye molecules are positive type dye molecules that absorb light in the long axis direction of the molecule.

Using the operating voltage applied between the first transparent electrode 6 and the second transparent electrode 8, the amount of light transmission through the liquid crystal layer 14 is controlled by changing the tilt angle of the liquid crystal molecules 15 to the thickness direction of the liquid crystal layer 14 in a state where the long axis direction of the liquid crystal molecules 15 is along the alignment direction defined by the first liquid crystal alignment film 10 and the second liquid crystal alignment film 12.

EXAMPLES

Hereinafter, the present invention will be described in more detail with reference to examples, but the present invention is not limited thereto.

The abbreviations used below are as follows. "Compounds used in polyimide-based polymer"

<Specific Diamine>

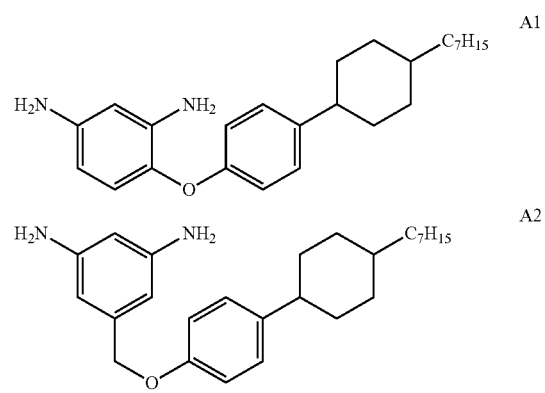

-continued

A3

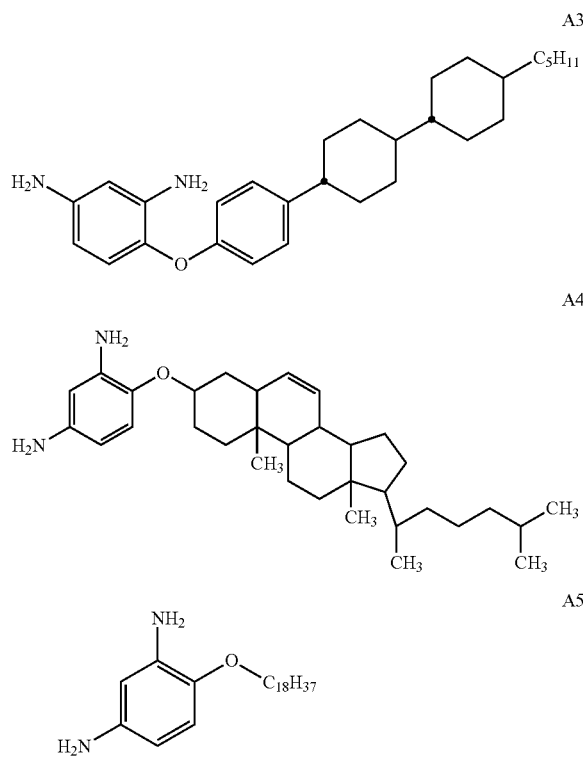

A4

A5

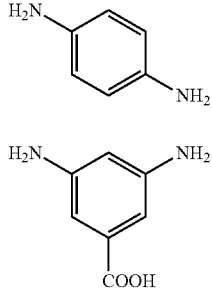

<Other Diamines>

B1

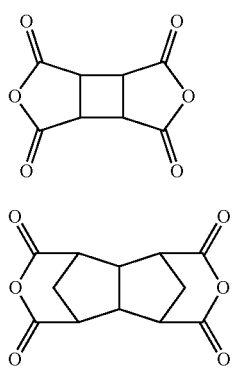

B2

<Specific Tetracarboxylic Acid Component>

C1

C2

-continued

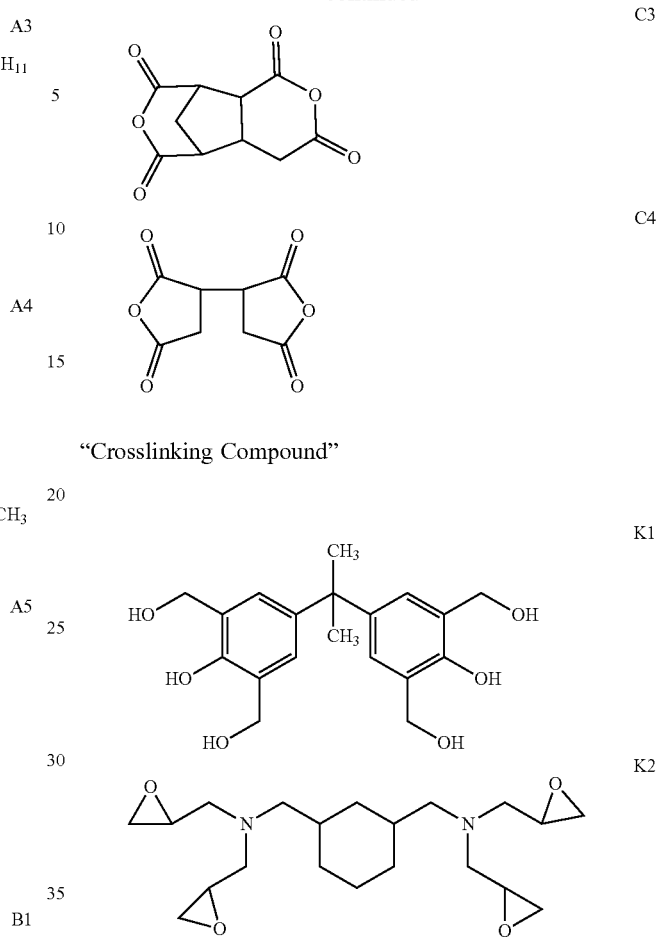

C3

C4

"Crosslinking Compound"

K1

K2

"Solvent"
NMP: N-Methyl-2-pyrrolidone
γ-BL: γ-Butyrolactone
BCS: Ethylene glycol monobutyl ether
PB: Propylene glycol monobutyl ether
PGME: Propylene glycol monomethyl ether "Measurement of Molecular Weight of Polyimide-Based Polymer"

Measurement was performed as follows using an ambient temperature gel permeation chromatography (GPC) apparatus (GPC-101) (manufactured by Showa Denko K. K.) and a column (KD-803, KD-805) (manufactured by Shodex).

Column temperature: 50° C.
Eluent: N,N-Dimethylformamide (as additives, 30 mmol/L (liter) of lithium bromide monohydrate (LiBr H$_2$O), 30 mmol/L of phosphoric acid-anhydride crystal (o-phosphoric acid), and 10 ml/L of tetrahydrofuran (THF))
Flow rate: 1.0 ml/min
Standard samples for preparing a calibration curve: TSK standard polyethylene oxides (molecular weight; about 900,000, 150,000, 100,000, and 30,000) (manufactured by Tosoh Corporation) and polyethylene glycols (molecular weight; about 12,000, 4,000, and 1,000) (manufactured by Polymer Laboratories Ltd.).

"Measurement of Imidization Rate of Polyimide-Based Polymer"

The polyimide powder, 20 mg, was placed in a nuclear magnetic resonance (NMR) sample tube (NMR sampling tube standard, φ5 (manufactured by Kusano Science Corp.)), deuterated dimethyl sulfoxide (DMSO-$d_6$, 0.05 mass % tetramethylsilane (TMS) mixture) (0.53 ml) was added thereto, and the mixture was completely dissolved by applying ultrasonic waves. This solution was subjected to proton NMR measurement at 500 MHz by an NMR measuring instrument (JNW-ECA500) (manufactured by JEOL DATUM Ltd.). Protons in the structure that does not change before and after imidization were designated as reference protons, and the imidization rate was determined using the integrated value of the peak of the protons and the integrated value of the proton peak assigned to the NH group of the amic acid appearing in the vicinity of 9.5 ppm to 10.0 ppm by the following equation.

Imidization rate (%)=(1−α·x/y)×100

Herein x is the integrated value of the proton peak assigned to the NH group of the amic acid, y is the integrated value of the peak of the reference protons, and a is the ratio of the number of the reference protons to one NH group proton of the amic acid in the case of the polyamic acid (imidization rate is 0%).

"Synthesis of Polyimide-Based Polymer"

Synthesis Example 1

C1 (3.20 g, 16.3 mmol), A1 (3.78 g, 9.93 mmol), and B1 (0.72 g, 6.66 mmol) were mixed in NMP (23.1 g) and reacted at 40° C. for 12 hours to obtain a polyamic acid solution (1) having a resin solid concentration of 25 mass %. The polyamic acid had a number average molecular weight (also referred to as Mn) of 23,200 and a weight average molecular weight (also referred to as Mw) of 71,700.

Synthesis Example 2

C1 (2.60 g, 13.3 mmol) and A1 (5.12 g, 13.5 mmol) were mixed in NMP (23.2 g) and reacted at 40° C. for 12 hours to obtain a polyamic acid solution (2) having a resin solid concentration of 25 mass %. The polyamic acid had an Mn of 19,800 and an Mw of 63,200.

Synthesis Example 3

C2 (3.57 g, 14.3 mmol), A3 (4.70 g, 10.9 mmol), and B2 (1.10 g, 7.23 mmol) were mixed in NMP (20.2 g) and reacted at 80° C. for 6 hours. Then, C1 (0.70 g, 3.57 mmol) and NMP (10.1 g) were added thereto, and the mixture was reacted at 40° C. for 12 hours to obtain a polyamic acid solution (3) having a resin solid concentration of 25 mass %. The polyamic acid had an Mn of 20,800 and an Mw of 65,700.

Synthesis Example 4

NMP was added to the polyamic acid solution (3) (20.0 g) obtained by the method of Synthesis Example 3 to dilute to 6 mass %, and then acetic anhydride (3.50 g) and pyridine (2.65 g) as imidization catalysts were added thereto, and the mixture was reacted at 60° C. for 4 hours. The reaction solution was poured into methanol (450 ml), and the resulting precipitate was separated by filtration. This precipitate was washed with methanol and dried under reduced pressure at 100° C. to obtain polyimide powder (4). The imidization rate of this polyimide was 78%, Mn was 17,100, and Mw was 49,800.

Synthesis Example 5

C4 (1.52 g, 7.67 mmol), A2 (3.06 g, 7.75 mmol), and B2 (0.79 g, 5.19 mmol) were mixed in γ-BL (17.0 g), and reacted at 60° C. for 8 hours. Then, C1 (1.00 g, 5.10 mmol) and γ-BL (8.49 g) were added thereto, and the mixture was reacted at 40° C. for 12 hours to obtain a polyamic acid solution (5) having a resin solid concentration of 20 mass %. The polyamic acid had an Mn of 16,900 and an Mw of 50,200.

Synthesis Example 6

C4 (1.21 g, 6.11 mmol) and A2 (4.08 g, 10.3 mmol) were mixed in γ-BL (16.3 g), and reacted at 60° C. for 8 hours. Then, C1 (0.80 g, 4.08 mmol) and γ-BL (8.13 g) were added thereto, and the mixture was reacted at 40° C. for 12 hours to obtain a polyamic acid solution (6) having a resin solid concentration of 20 mass %. The polyamic acid had an Mn of 12,500 and an Mw of 45,100.

Synthesis Example 7

C3 (3.10 g, 13.8 mmol), A4 (3.47 g, 7.04 mmol), and B2 (1.07 g, 7.03 mmol) were mixed in NMP (22.9 g), and reacted at 40° C. for 12 hours to obtain a polyamic acid solution (7) having a resin solid concentration of 25 mass %. The polyamic acid had an Mn of 15,800 and an Mw of 43,500.

Synthesis Example 8

C1 (2.60 g, 13.3 mmol) and A5 (5.07 g, 13.5 mmol) were mixed in NMP (23.0 g), and reacted at 40° C. for 12 hours to obtain a polyamic acid solution (8) having a resin solid concentration of 25 mass %. The polyamic acid had an Mn of 17,200 and an Mw of 60,900.

Synthesis Example 9

C1 (3.80 g, 19.4 mmol), A1 (2.25 g, 5.91 mmol), and B1 (1.49 g, 13.8 mmol) were mixed in NMP (22.6 g) and reacted at 40° C. for 12 hours to obtain a polyamic acid solution (9) having a resin solid concentration of 25 mass %. The polyamic acid had an Mn of 25,800 and an Mw of 76,100.

Synthesis Example 10

C4 (1.82 g, 9.19 mmol), A2 (1.84 g, 4.66 mmol), and B2 (1.65 g, 10.8 mmol) were mixed in γ-BL (17.4 g), and reacted at 60° C. for 8 hours. Then, C1 (1.20 g, 6.12 mmol) and γ-BL (8.68 g) were added thereto, and the mixture was reacted at 40° C. for 12 hours to obtain a polyamic acid solution (10) having a resin solid concentration of 20 mass %. The polyamic acid had an Mn of 18,500 and an Mw of 53,800.

Polyimide-based polymers obtained in the synthesis examples are shown in Table 1.

TABLE 1

| Synthesis example | Polyimide-based polymer | Tetracarboxylic acid component | Diamine component | | Imidization rate (%) |
|---|---|---|---|---|---|
| | | | Specific diamine | Other diamines | |
| 1 | Polyamic acid solution (1) | C1 (3.20 g, 16.3 mmol) | A1 (3.78 g, 9.93 mmol) | B1 (0.72 g, 6.66 mmol) | *1 |
| 2 | Polyamic acid solution (2) | C1 (2.60 g, 13.3 mmol) | A1 (5.12 g, 13.5 mmol) | — | *1 |
| 3 | Polyamic acid solution (3) | C1 (0.70 g, 3.57 mmol) C2 (3.57 g, 14.3 mmol) | A3 (4.70 g, 10.9 mmol) | B2 (1.10 g, 7.23 mmol) | *1 |
| 4 | Polyimide powder (4) | C1 (0.70 g, 3.57 mmol) C2 (3.57 g, 14.3 mmol) | A3 (4.70 g, 10.9 mmol) | B2 (1.10 g, 7.23 mmol) | 78 |
| 5 | Polyamic acid solution (5) | C1 (1.00 g, 5.10 mmol) C4 (1.52 g, 7.67 mmol) | A2 (3.06 g, 7.75 mmol) | B2 (0.79 g, 5.19 mmol) | *1 |
| 6 | Polyamic acid solution (6) | C1 (0.80 g, 4.08 mmol) C4 (1.21 g, 6.11 mmol) | A2 (4.08 g, 10.3 mmol) | — | *1 |
| 7 | Polyamic acid solution (7) | C3 (3.10 g, 13.8 mmol) | A4 (3.46 g, 7.02 mmol) | B2 (1.07 g, 7.03 mmol) | *1 |
| 8 | Polyamic acid solution (8) | C1 (2.60 g, 13.3 mmol) | A5 (5.07 g, 13.5 mmol) | — | *1 |
| 9 | Polyamic acid solution (9) | C1 (3.80 g, 19.4 mmol) | A1 (2.25 g, 5.91 mmol) | B1 (1.49 g, 13.8 mmol) | *1 |
| 10 | Polyamic acid solution (10) | C1 (1.20 g, 6.12 mmol) C4 (1.82 g, 9.19 mmol) | A2 (1.84 g, 4.66 mmol) | B2 (1.65 g, 10.8 mmol) | *1 |

*1: Polyamic acid

"Production of Liquid Crystal Aligning Agent"

Example 1

NMP (16.0 g) and BCS (15.7 g) were added to the polyamic acid solution (1) (10.0 g) obtained by the method of Synthesis Example 1, and the mixture was stirred at 25° C. for 6 hours to obtain a liquid crystal aligning agent (1). The liquid crystal aligning agent had no anomalies such as turbidity or precipitation, and was a uniform solution.

Example 2

NMP (16.0 g) and BCS (15.7 g) were added to the polyamic acid solution (2) (10.0 g) obtained by the method of Synthesis Example 2, and the mixture was stirred at 25° C. for 6 hours to obtain a liquid crystal aligning agent (2). The liquid crystal aligning agent had no anomalies such as turbidity or precipitation, and was a uniform solution.

Example 3

K1 (0.18 g), NMP (16.0 g), and BCS (15.7 g) were added to the polyamic acid solution (2) (10.0 g) obtained by the method of Synthesis Example 2, and the mixture was stirred at 25° C. for 6 hours to obtain a liquid crystal aligning agent (3). The liquid crystal aligning agent had no anomalies such as turbidity or precipitation, and was a uniform solution.

Example 4

NMP (16.0 g), BCS (7.83 g), and PB (7.83 g) were added to the polyamic acid solution (3) (10.0 g) obtained by the method of Synthesis Example 3, and the mixture was stirred at 25° C. for 6 hours to obtain a liquid crystal aligning agent (4). The liquid crystal aligning agent had no anomalies such as turbidity or precipitation, and was a uniform solution.

Example 5

NMP (27.4 g) was added to the polyimide powder (4) (2.50 g) obtained by the method of Synthesis Example 4, and the mixture was stirred at 70° C. for 24 hours for dissolution. Then, PB (11.8 g) was added thereto, and the mixture was stirred at 25° C. for 6 hours to obtain a liquid crystal aligning agent (5). The liquid crystal aligning agent had no anomalies such as turbidity or precipitation, and was a uniform solution.

Example 6

γ-BL (1.60 g) was added to the polyamic acid solution (5) (10.0 g) obtained by the method of Synthesis Example 5, and the mixture was stirred at 25° C. for 4 hours. Then, PGME (38.4 g) was added thereto, and the mixture was stirred at 25° C. for 6 hours to obtain a liquid crystal aligning agent (6). The liquid crystal aligning agent had no anomalies such as turbidity or precipitation, and was a uniform solution.

Example 7

γ-BL (1.60 g) was added to the polyamic acid solution (6) (10.0 g) obtained by the method of Synthesis Example 6, and the mixture was stirred at 25° C. for 4 hours. Then, PGME (38.4 g) was added thereto, and the mixture was stirred at 25° C. for 6 hours to obtain a liquid crystal aligning agent (7). The liquid crystal aligning agent had no anomalies such as turbidity or precipitation, and was a uniform solution.

Example 8

γ-BL (1.60 g) was added to the polyamic acid solution (6) (10.0 g) obtained by the method of Synthesis Example 6, and the mixture was stirred at 25° C. for 4 hours. Then, K2 (0.10 g) and PGME (38.4 g) were added thereto, and the mixture was stirred at 25° C. for 6 hours to obtain a liquid crystal aligning agent (8). The liquid crystal aligning agent had no anomalies such as turbidity or precipitation, and was a uniform solution.

Example 9

K1 (0.13 g), NMP (23.8 g), and BCS (7.83 g) were added to the polyamic acid solution (7) (10.0 g) obtained by the method of Synthesis Example 7, and the mixture was stirred at 25° C. for 6 hours to obtain a liquid crystal aligning agent (9). The liquid crystal aligning agent had no anomalies such as turbidity or precipitation, and was a uniform solution.

Example 10

K1 (0.18 g), NMP (16.0 g), BCS (7.83 g), and PB (7.83 g) were added to the polyamic acid solution (8) (10.0 g) obtained by the method of Synthesis Example 8, and the mixture was stirred at 25° C. for 6 hours to obtain a liquid crystal aligning agent (10). The liquid crystal aligning agent had no anomalies such as turbidity or precipitation, and was a uniform solution.

Comparative Example 1

NMP (16.0 g) and BCS (15.7 g) were added to the polyamic acid solution (9) (10.0 g) obtained by the method of Synthesis Example 9, and the mixture was stirred at 25° C. for 6 hours to obtain a liquid crystal aligning agent (11). The liquid crystal aligning agent had no anomalies such as turbidity or precipitation, and was a uniform solution.

Comparative Example 2

γ-BL (1.60 g) was added to the polyamic acid solution (10) (10.0 g) obtained by the method of Synthesis Example 10, and the mixture was stirred at 25° C. for 4 hours. Then, PGME (38.4 g) was added thereto, and the mixture was stirred at 25° C. for 6 hours to obtain a liquid crystal aligning agent (12). The liquid crystal aligning agent had no anomalies such as turbidity or precipitation, and was a uniform solution.

The liquid crystal aligning agents obtained in the examples and the comparative examples are shown in Table 2.

TABLE 2

|  | Liquid crystal aligning agent | Polyimide-based polymer | Crosslinking compound*2 |
| --- | --- | --- | --- |
| Example 1 | (1) | Polyamic acid solution (1) | — |
| Example 2 | (2) | Polyamic acid solution (2) | — |
| Example 3 | (3) | Polyamic acid solution (2) | K1 (7) |
| Example 4 | (4) | Polyamic acid solution (3) | — |
| Example 5 | (5) | Polyimide powder (4) | — |
| Example 6 | (6) | Polyamic acid solution (5) | — |
| Example 7 | (7) | Polyamic acid solution (6) | — |
| Example 8 | (8) | Polyamic acid solution (6) | K2 (5) |
| Example 9 | (9) | Polyamic acid solution (7) | K1 (5) |
| Example 10 | (10) | Polyamic acid solution (8) | K1 (7) |
| Comparative example 1 | (11) | Polyamic acid solution (9) | — |
| Comparative example 2 | (12) | Polyamic acid solution (10) | — |

*2The numerical value in the parenthesis represents the amount (parts by mass) of the crosslinking compound introduced based on 100 parts by mass of the polyimide-based polymer.

"Production of Liquid Crystal Composition"
<Production of Liquid Crystal Composition (A)>

MLC-6608 (manufactured by Merck K GaA) (10.0 g), Dichroic dye Blue AB4 (manufactured by Nematel GmbH & Co. KG) (0.015 g), Dichroic dye Yellow AG1 (manufactured by Nematel GmbH & Co. KG) (0.020 g), and Dichroic dye Red ARI (manufactured by Nematel GmbH & Co. KG) (0.015 g) were mixed and stirred at 80° C. for 24 hours to obtain a liquid crystal composition (A).

Among the above components, MLC-6608 (manufactured by Merck K GaA) is a liquid crystal, and the other components are dichroic dyes.

"Production of Liquid Crystal Light Control Element (Glass Substrate)"

The liquid crystal aligning agent obtained by the method of the example was pressure filtered through a membrane filter with a pore diameter of 1 μm. A glass substrate with an ITO electrode of 30×40 mm was washed with pure water and isopropyl alcohol (IPA). The ITO surface of the substrate was spin-coated with the obtained solution, which was subjected to a heat treatment at 80° C. for 2 minutes on a hot plate and at 220° C. for 30 minutes in a heat circulation type clean oven to obtain an ITO substrate with a liquid crystal alignment film having a film thickness of 100 nm. Two ITO substrates with the liquid crystal alignment film were prepared and combined such that a spacer of 6 μm was sandwiched with the liquid crystal alignment film surfaces facing inward, and the periphery was bonded with a sealant, to prepare an empty cell. The liquid crystal composition (A) was injected into the empty cell by a reduced pressure injection method, and the injection port was sealed to obtain a liquid crystal light control element (glass substrate).

The resulting liquid crystal light control elements were observed under a polarizing microscope for alignment uniformity of the liquid crystals, finding that the liquid crystals were uniformly aligned in all the liquid crystal light control elements. In addition, all the liquid crystal light control elements were driven by voltage application (AC drive: 5 V), and the brightness difference of the total light transmittance due to no voltage application and voltage application was examined.

"Production of Liquid Crystal Light Control Element (Plastic Substrate)"

The liquid crystal aligning agent obtained by the method of the example was pressure filtered through a membrane filter with a pore diameter of 1 μm. A PET substrate (length: 150 mm, width: 150 mm, thickness: 0.1 mm) with an ITO electrode of 150×150 mm was washed with pure water. The obtained solution was applied onto the ITO surface of the substrate with a bar coater, which was subjected to a heat treatment at 120° C. for 2 minutes in a heat circulation type clean oven to obtain an ITO substrate with a liquid crystal alignment film having a film thickness of 100 nm. Two ITO substrates with a liquid crystal alignment film were prepared, and a spacer of 6 μm was applied to the surface of the liquid crystal alignment film on one of the substrates. Thereafter, the periphery of the substrate was subjected to drawing of an ultraviolet curing type sealant, by the ODF method, the liquid crystal composition (A) was dropped, then the substrates were bonded such that the liquid crystal alignment film surface of the other substrate faced thereto, and a curing treatment of the sealant was performed to obtain a liquid crystal light control element (plastic substrate). When dropping of the liquid crystal composition (A), bonding, and curing treatment of the sealant were performed by the ODF method, a glass substrate was used as a support substrate of the PET substrate with an ITO electrode.

The resulting liquid crystal light control elements were observed under a polarizing microscope for alignment uniformity of the liquid crystals, finding that the liquid crystals were uniformly aligned in all the liquid crystal light control elements. In addition, all the liquid crystal light control elements were driven by voltage application (AC drive: 5 V), and the brightness difference of the total light transmittance due to no voltage application and voltage application was examined.

"Evaluation of Light Stability"

This evaluation was performed by measuring the haze of the liquid crystal light control element in a state where a voltage was applied (AC drive: 5 V) before light irradiation (initial stage) and after light irradiation. Specifically, the liquid crystal light control element was irradiated with light for 336 hours using Q-SUN Xe-1 Xenon Test Chamber (manufactured by Q-LAB Corporation) (Cut filter: Day Light F Filter, chamber temperature: 60° C.) as a light irradiation apparatus. In this evaluation, the smaller the change of the haze after light irradiation relative to the haze before light irradiation, the better the light stability. In Example 11 to Example 13 and Example 16 to Example 18, measurement after light irradiation for 672 hours was performed as an emphasized test in addition to the above standard test. The evaluation method is the same as described above.

Example 11 to Example 20, Comparative Example 3, and Comparative Example 4

Using one of the liquid crystal aligning agent (1) to the liquid crystal aligning agent (12) obtained by the above method and the liquid crystal composition (A), a liquid crystal light control element was produced and the light stability was evaluated by the above method. In producing the element, glass substrates were used in Example 11 to Example 15, Example 19, Example 20, and Comparative Example 3, and plastic substrates were used in Example 16 to Example 18 and Comparative Example 4.

TABLE 3

| Example | Liquid crystal aligning agent | Haze (%) | | |
|---|---|---|---|---|
| | | Initial stage | After 336 hours (Standard test) | After 672 hours (Emphasized test) |
| 11 | (1) | 0.3 | 2.6 | 3.2 |
| 12 | (2) | 0.3 | 1.5 | 2.1 |
| 13 | (3) | 0.2 | 0.6 | 1.2 |

TABLE 3-continued

| Example | Liquid crystal aligning agent | Haze (%) | | |
|---|---|---|---|---|
| | | Initial stage | After 336 hours (Standard test) | After 672 hours (Emphasized test) |
| 14 | (4) | 0.4 | 0.7 | — |
| 15 | (5) | 0.3 | 0.5 | — |
| 16 | (6) | 0.2 | 2 | 2.6 |
| 17 | (7) | 0.2 | 0.9 | 1.5 |
| 18 | (8) | 0.3 | 0.5 | 0.8 |
| 19 | (9) | 0.3 | 0.6 | — |
| 20 | (10) | 0.2 | 0.4 | — |

TABLE 4

| Comparative example | Liquid crystal aligning agent | Haze (%) | | |
|---|---|---|---|---|
| | | Initial stage | After 336 hours (Standard test) | After 672 hours (Emphasized test) |
| 3 | (11) | 0.3 | 24 | — |
| 4 | (12) | 0.2 | 21.1 | — |

As described above, in the liquid crystal light control elements of the examples using the liquid crystal aligning agent containing the polyimide-based polymer in which the specific diamine having a specific structure was used and the proportion of the specific diamine used was high, the change of the haze after light irradiation relative to the haze before light irradiation was smaller than that in the comparative examples in which the proportion of the specific diamine used was low. Specifically, the comparison is made between Example 11 and Comparative Example 3 and between Example 16 and Comparative Example 4.

When the proportion of the specific diamine used was higher, the change of the haze after light irradiation relative to the haze before light irradiation was smaller in the emphasized test. Specifically, the comparison under the same conditions is made between Example 11 and Example 12 and between Example 16 and Example 17.

When the crosslinking compound was introduced into the liquid crystal aligning agent, the change of the haze after light irradiation relative to the haze before light irradiation was reduced. Specifically, the comparison under the same conditions is made between Example 12 and Example 13 and between Example 17 and Example 18.

INDUSTRIAL APPLICABILITY

By using a liquid crystal aligning agent containing a polyimide-based polymer having a specific structure, a liquid crystal light control element that does not undergo deterioration in optical characteristics due to light irradiation can be obtained.

In addition, the liquid crystal light control element of the present invention is useful for e.g. liquid crystal displays intended for display and light control windows and optical shutters for controlling transmission and blocking of light.

REFERENCE SIGNS LIST

1 Liquid crystal light control element
2 First transparent substrate
4 Second transparent substrate 6 First transparent electrode
8 Second transparent electrode
10 First liquid crystal alignment film
12 Second liquid crystal alignment film
14 Liquid crystal layer
15 Liquid crystal molecules
16 First connection terminal
17 Second connection terminal

The invention claimed is:

1. A liquid crystal light control element that controls a light absorption state by voltage application, the liquid crystal light control element comprising:
  a liquid crystal layer containing a liquid crystal composition between a pair of substrates each having an electrode; and
  a liquid crystal alignment film that is provided on at least one substrate of the pair of substrates and aligns a liquid crystal vertically,
  wherein the liquid crystal composition contains a liquid crystal and a dichroic dye,
  the liquid crystal alignment film is obtained from a liquid crystal aligning agent containing a polyimide precursor in which a diamine having at least one structure selected from Formula [1-1] and Formula [1-2] is used as a part of a raw material or a polyimide obtained by imidizing the polyimide precursor, and
  a proportion of the diamine used is 50 to 100 mol % based on an entire diamine component in the polyimide precursor or the polyimide:

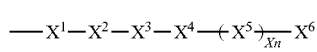
[1-1]

wherein $X^1$ represents a single bond, —$(CH_2)_a$— wherein a is an integer of 1 to 15, —O—, —$CH_2O$—, —CONH—, —NHCO—, —$CON(CH_3)$—, —$N(CH_3)CO$—, —COO—, or —OCO—, $X^2$ represents a single bond or —$(CH_2)_b$— wherein b is an integer of 1 to 15, $X^3$ represents a single bond, —$(CH_2)_c$— wherein c is an integer of 1 to 15, —O—, —$CH_2O$—, —COO—, or —OCO—, $X^4$ represents a divalent cyclic group selected from a benzene ring, a cyclohexane ring, and a heterocyclic ring, or a $C_{17}$-$C_{51}$ divalent organic group having a steroid skeleton, and any hydrogen atom on the cyclic group may be substituted with a $C_1$-$C_3$ alkyl group, a $C_1$-$C_3$ alkoxy group, a $C_1$-$C_3$ fluorine-containing alkyl group, a $C_1$-$C_3$ fluorine-containing alkoxy group, or a fluorine atom, $X^5$ represents a divalent cyclic group selected from a benzene ring, a cyclohexane ring, and a heterocyclic ring, and any hydrogen atom on these cyclic groups may be substituted with a $C_1$-$C_3$ alkyl group, a $C_1$-$C_3$ alkoxy group, a $C_1$-$C_3$ fluorine-containing alkyl group, a $C_1$-$C_3$ fluorine-containing alkoxy group, or a fluorine atom, Xn represents an integer of 0 to 4, and $X^6$ represents a $C_1$-$C_{18}$ alkyl group, a $C_2$-$C_{18}$ alkenyl group, a $C_1$-$C_{18}$ fluorine-containing alkyl group, a $C_1$-$C_{18}$ alkoxy group, or a $C_1$-$C_{18}$ fluorine-containing alkoxy group,

—$X^7$—$X^8$ [1-2]

wherein $X^7$ represents a single bond, —O—, —$CH_2O$—, —CONH—, —NHCO—, —$CON(CH_3)$—, —$N(CH_3)CO$—, —COO—, or —OCO— and $X^8$ presents a $C_8$-$C_{22}$ alkyl group or a $C_6$-$C_{18}$ fluorine-containing alkyl group, and wherein a content of of the dichroic dye in the liquid crystal composition is from 0.01 to 10 parts by mass based upon 100 parts by mass of the liquid crystal.

2. The liquid crystal light control element according to claim 1, wherein the proportion of the diamine used is 80 to 100 mol % based on the entire diamine component in the polyimide precursor or the polyimide.

3. The liquid crystal light control element according to claim 1, wherein the proportion of the diamine used is 100 mol % based on the entire diamine component in the polyimide precursor or the polyimide.

4. The liquid crystal light control element according to claim 1, wherein the diamine is represented by Formula [1a]:

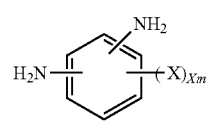
[1a]

wherein X represents a structure of Formula [1-1] or Formula [1-2], Xm represents an integer of 1 to 4, and a plurality of Xs each independently have an above definition when Xm is 2 or more.

5. The liquid crystal light control element according to claim 1, wherein the liquid crystal aligning agent contains a polyimide precursor in which a tetracarboxylic acid of Formula [2] is used as a part of a raw material or a polyimide obtained by imidizing the polyimide precursor, as the polyimide precursor or the polyimide, or as another polyimide precursor or another polyimide:

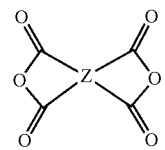
[2]

wherein Z represents any one structure selected from Formula [2a] to Formula [2l]:

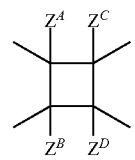
[2a]

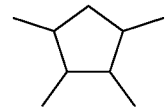
[2b]

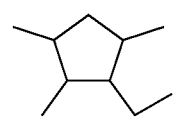
[2c]

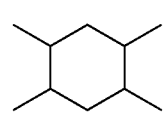
[2d]

-continued

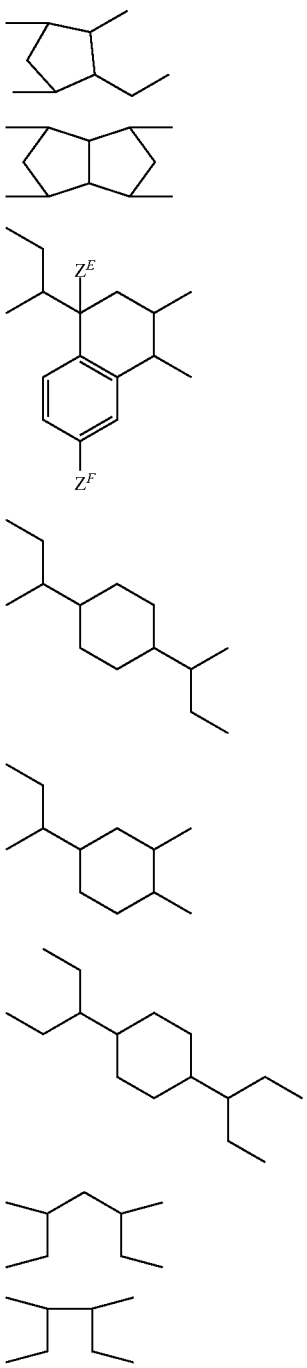

wherein $Z^A$ to $Z^D$ each independently represent a hydrogen atom, a methyl group, a chlorine atom, or a phenyl group and $Z^E$ and $Z^F$ each independently represent a hydrogen atom or a methyl group.

6. The liquid crystal light control element according to claim 1, wherein the liquid crystal aligning agent contains a compound having at least one selected from the group consisting of an epoxy group, an isocyanate group, an oxetane group, a cyclocarbonate group, a hydroxy group, a hydroxyalkyl group, and a $C_1$-$C_3$ alkoxyalkyl group.

7. The liquid crystal light control element according to claim 1, wherein the substrate is a glass substrate or a plastic substrate.

8. A liquid crystal alignment film that is used in the liquid crystal light control element according to claim 1.

9. A liquid crystal aligning agent that forms the liquid crystal alignment film according to claim 8.

10. The liquid crystal light control element according to claim 1, wherein the diamine is a diamine selected from the group consisting of Formula [1a-32] to Formula [1a-41]:

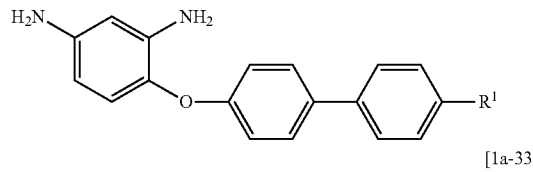
[1a-32]

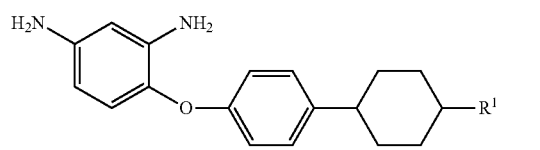
[1a-33]

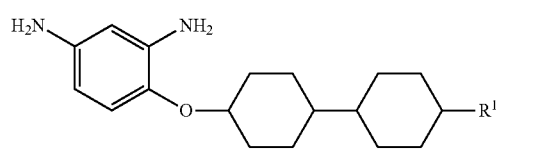
[1a-34]

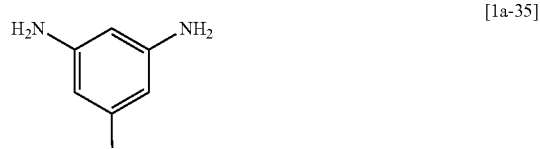
[1a-35]

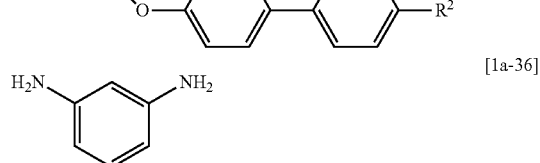
[1a-36]

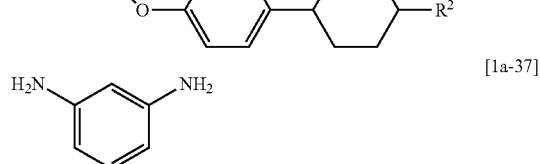
[1a-37]

wherein $R^1$ and $R^2$ each represent a $C_3$-$C_{12}$ alkyl group:

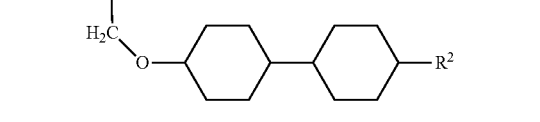
[1a-38]

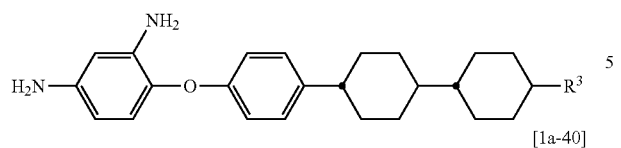
[1a-39]
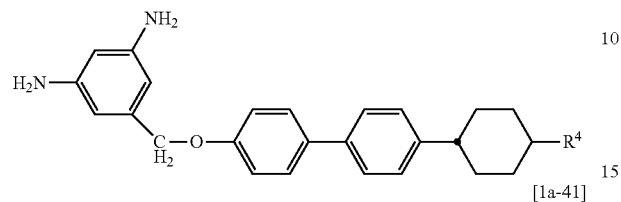
[1a-40]
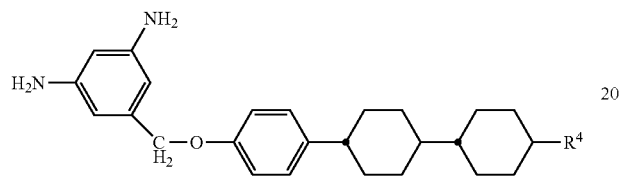
[1a-41]
wherein $R^3$ and $R^4$ each represent a $C_3$-$C_{12}$ alkyl group, and the 1,4-cyclohexylene groups are each a trans isomer.
* * * * *